May 23, 1967
L. VITA
3,320,621
SEWAGE DISPOSAL SYSTEM FOR FLOATING VESSELS
Filed April 21, 1965
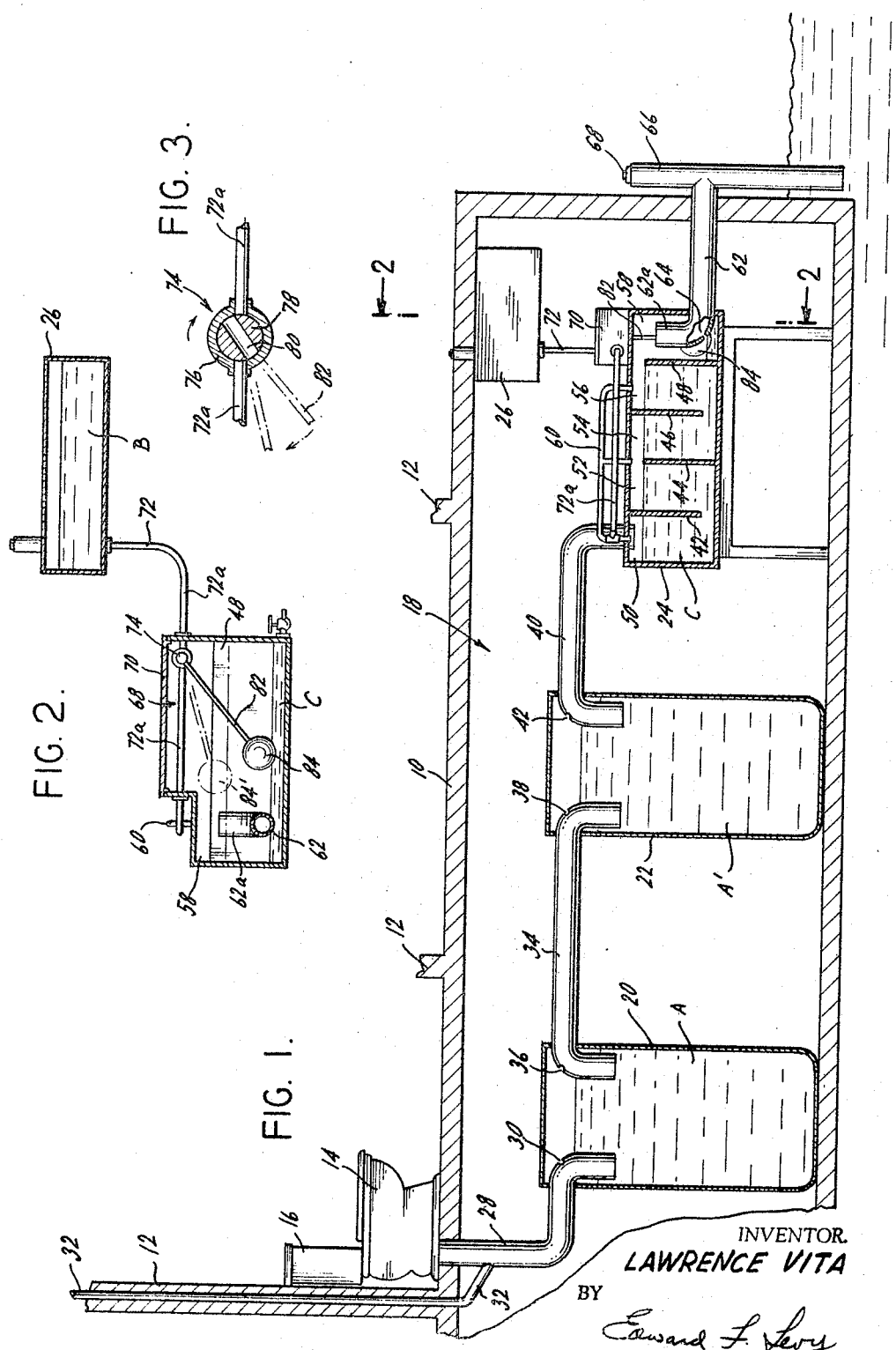
INVENTOR.
LAWRENCE VITA
BY
Edward F. Levy
ATTORNEY

United States Patent Office 3,320,621
Patented May 23, 1967

---

3,320,621
SEWAGE DISPOSAL SYSTEM FOR FLOATING VESSELS
Lawrence Vita, Fort Lauderdale, Fla., assignor to Surfside 6 Floating Homes, Inc., Fort Lauderdale, Fla., a corporation of Delaware
Filed Apr. 21, 1965, Ser. No. 449,774
16 Claims. (Cl. 4—10)

The present invention relates to improvements in sewage systems and in particular to a novel and improved septic tank system especially adapted for use on ships, boats and other water-borne vessels having toilet facilities.

In the use of houseboats, yachts, and the like, sewage disposal generally presents no problem when the vessel is in an ocean, river or other large body of water which feeds into an ocean. Where the vessel is on an enclosed body of water or is anchored or moored close to shore or in a bathing area, the problem of sewage disposal becomes acute and health authorities prohibit the discharge of sewage, particularly solid matter, in these areas. The problem is accentuated by the fact that if the vessel remains in these areas for any period of time, sewage accumulates therein and there is no way of disposing of the same.

It would be desirable to provide septic tanks on vessels of this type so as to reduce the sewage by natural bacteria action to a clear liquid affluent and discharge the same into the body of water. This, however, is not feasible in habitated areas since the affluent discharged by the septic tank contains a high concentration of bacteria and will pollute the surrounding water.

It is an object of the present invention to provide a novel sewage disposal system for water-borne vessels which will reduce the sewage to liquid form by septic action and which will subsequently discharge the liquified sewage into the surrounding water in a purified, antiseptic form.

Another object of the invention is the provision of a sewage disposal system of the character described which provides a continuous plumbing system for the vessel in which it is installed whereby sewage is constantly and automatically disposed of outside of said vessel.

A further object of the invention is the provision of a sewage disposal system of the character described which includes a septic tank for disintegrating solids and producing a liquid affluent, and an automatic metering system for injecting a bactericide into said affluent before discharge of the latter from said vessel.

In accordance with the invention there is provided a sewage disposal system for water-borne vessels, including one or more septic tanks fed by the toilet facilities of said vessel and capable of reducing the sewage fed thereto to liquid form by bacteria action. This liquid sewage is in turn fed to a retention tank having a plurality of baffles therein and providing a tortuous path through which the liquid sewage advances progressively each time sewage is discharged into the septic tank. The retention tank has a chamber at its outlet end which is normally empty or substantially empty, and which becomes filled when the passage of liquid through the retention tank causes an overflow condition therein. Associated with the retention tank is a metering assembly for feeding a measured amount of bactericide to the inlet end of the retention tank for destroying the bacteria in the liquid fed to the retention tank. The metering assembly includes a float valve operable when the retention tank chamber is filled with liquid each time sewage is discharged into the septic tank.

Additional objects and advantages of the invention will become apparent during the course of the following specification when taken in connection with the accompanying drawings, in which:

FIG. 1 is a diagrammatic representation of the sewage disposal system of the present invention shown installed in a vessel, with the parts thereof shown in side elevation and broken away and sectioned to reveal inner construction;

FIG. 2 is a sectional view of the metering assembly of the sewage disposal system, taken along line 2—2 of FIG. 1, and FIG. 3 is an enlarged sectional view of the valve included in the metering assembly of FIG. 2.

Referring in detail to the drawings, FIG. 1 shows diagrammatically a portion of the interior of a water-borne vessel such as a houseboat, yacht or the like, having toilet facilities and incorporating the sewage disposal system of the present invention. The vessel has a horizontal partition 10 which may constitute the deck, and which, as indicated, may be divided by vertical partitions 12 into a number of rooms to provide living quarters.

Mounted on the partition 12 is a toilet 14 having a conventional flush tank 16. This toilet 14 as well as any other toilets with which the vessel is equipped, feeds into the sewage disposal system 18 which is installed beneath the toilet 14, in the hold of the vessel, or at least below the deck level.

The sewage disposal system 18 includes one or more septic tanks (two septic tanks 20 and 22 being illustrated in FIG. 1 by way of illustration), a retention tank 24, and a chlorine supply tank 26. The septic tanks 20 and 22 are of identical construction, each being entirely enclosed and having a large capacity, in one commercial embodiment this being 135 gallons.

The toilet has a discharge pipe 28 extending downwardly therefrom and entering tank 20 through an opening in the upper side wall thereof. The end of pipe 28 within said tank extends downwardly therein a short distance below the top wall of said tank, and has a vent port 30 therein. A vent pipe 32 communicates with the system through the discharge pipe 28 and opens at the roof of the cabin containing toilet 14. A conduit in the nature of pipe 34 connects the two septic tanks, and has end portions extending downwardly within said tanks to the same level as the end of discharge pipe 28. These end portions contain respective vent ports 36 and 38.

A similar pipe 40 connects the septic tank 22 with the retention tank 24. Pipe 40 has an end portion extending downwardly within septic tank 22 to the same level as the ends of pipes 28 and 34, and containing a vent port 42. The other depending end of pipe 40 opens into the top of retention tank 24 at one end thereof.

Retention tank 24 is low and elongated, and is adapted to retain a large volume of liquid. In a preferred commercial embodiment, the tank was made of plywood, lined with fibreglass. Within the interior of tank 24 are four spaced partitions 42, 44, 46 and 48 each of which extend the width of said tank. The partitions 42 and 46 are spaced from the bottom wall of tank 24 and the partitions 44 and 48 are spaced from the top wall of said tank. The partitions divide the interior of retention tank 24 into five compartments 50, 52, 54, 56 and 58, and serve as baffles, providing a tortuous path for the flow of liquid through the retention tank as will be presently described. A branched vent pipe 60 connects the upper ends of the compartments 50–58.

A horizontally-disposed discharge conduit 62 leads from the end compartment 58 to the exterior of the vessel. The conduit 62 has an upstanding end portion 62a located within compartment 58 and containing a weep hole 64. The other end of conduit 68 projects outwardly of the vessel and communicates with a vertical outlet pipe 66. The outlet pipe 66 extends below the water level, and at its upper end is covered by a removable clean-out cap 68.

In accordance with the invention, means are provided for automatically feeding a metered amount of bactericide to the retention tank 24 each time liquid is displaced therefrom. Such means includes the supply tank 26 and the metering assembly 68 shown in detail in FIGS. 2 and 3.

As shown in FIG. 1, the retention tank 24 has an upstanding hollow extension section 70 located above and communicating with the interior of the end compartment 58. The supply tank 26 is mounted against the under surface of partition 10 at a higher level than the section 70. As shown in FIG. 2, a feed pipe 72 communicates with the interior of supply tank 26 through the bottom wall thereof and extends downwardly to the retention tank 24, terminating in a horizontal portion 72a extending entirely through the interior of extension section 70 and communicating with the vertical branch of vent pipe 60 which leads into the first retention tank compartment 50.

Within the retention tank section 70, the horizontal portion 72a of feed pipe 72 is interrupted by a rotary valve 74. Valve 74 comprises a hollow spherical casing 76 preferably made of glass, and containing a spherical valve member 78 preferably made of Teflon and containing a diametrically-disposed through bore 78. The valve member 78 is adapted to be turned by an elongated rod 82 located outside of casing 76 and connected to the valve member 78. The free end of rod 82 carries a float 84. The float 84, rod 82, and valve 74 are all made of materials which are impervious to the chlorine or other bactericide contained in supply tank 26.

In use, the septic tanks 20 and 22 are initially filled with water up to the level shown in FIG. 1, which is slightly below the vent holes 30, 36, and in which the ends of pipes 28 and 34 are submerged. The retention tank 24 is also filled with water up to the level of the top edges of baffles 44 and 48, as shown. The end compartment 58 is empty or substantially empty, and the float 84 is in a lowered position.

When the toilet 14 is flushed by means of flush tank 16, approximately four gallons of sewage are discharged through pipe 28 into the septic tank 20. This raises the level of the liquid in tank 20, causing a corresponding amount of liquid to siphon through pipe 34 into the septic tank 22, thereby raising the level of the liquid therein and in turn causing a corresponding amount of liquid to siphon through pipe 40 into the retention tank 24.

As sewage is repeatedly discharged into septic tank 20, the solids therein settle to the bottom, leaving liquid at the upper portion thereof. As the solids are retained in the tank, a high concentration of bacteria develops therein, which digests the solids in the usual manner of septic tanks, producing an affluent with a very high bacteria content. It will be noted that only the toilet facilities of the vessel feed into the sewage disposal system, and not clothes washers, kitchen sinks, showers, or the like. Since the system is thus kept free of detergents or other materials which would interfere with this bacteria action, it is not necessary to provide a large septic tank, and a single tank of thirty-five gallon capacity will serve to reduce all of the sewage solids fed to the system. In the system illustrated herein, two septic tanks are provided to insure that even under extreme use of the toilet facilities, no solids are fed to the retention tank 24.

The supply tank 26 contains a quantity of suitable bactericide B in liquid form, capable of killing the bacteria in the affluent fed to the retention tank. The bactericide B is preferably a 10% solution of chlorine in water, which will not itself contaminate or poison the water surrounding the vessel.

FIG. 1 shows the system after a period of use, in which the septic tanks 20 and 22 are filled with affluent A and A' with all solids reduced or digested by the aforementioned bacteria action. The retention tank is filled with liquid C constituting a mixture of the affluent and chlorine, in which the affluent is purified of bacteria by the chlorine. When the toilet 14 is flushed, four gallons of sewage are discharged into the septic tank 20, as previously described, causing a corresponding four gallons of bacteria-laden affluent A to be transferred through pipe 34 to septic tank 22. This spreads downwardly and mixes with the affluent A' in tank 22 and the bacteria action continues in tank 22. At the same time, four gallons of clear but bacteria laden affluent A' is fed through pipe 40 into the first compartment 50 of retention tank 24. Compartment 50 contains chlorine solution which was previously fed by the metering assembly 68, in the manner to be presently described, which chlorine attacks and kills the bacteria in the affluent.

As the affluent A' is fed to the compartment 50, it causes the chlorine-treated affluent C already in the compartment to flow beneath partition 42 into compartment 52, and in turn to cause the liquid in compartment 52 to overflow above partition 44 into compartment 54. The liquid in retention tank 24 continues to flow past the baffle partitions 46 and 48, finally overflowing into end compartment 58, and filling said compartment up to the level of the open end of discharge pipe 62. As the level of the liquid in compartment 58 rises, the float 84 is raised to the level shown in broken line at 84' in FIG. 2, causing rod 82 to turn the valve member 78 until the bore 80 is aligned with feed pipe section 72a. The chlorine solution B in supply tank 26 thus feeds by gravity through pipe 72 into the first compartment 50 of retention tank 26. The liquid in the end compartment 58 flows slowly through weep hole 64, through discharge conduit 62 and outlet pipe 66 into the water surrounding the vessel, and the float 84 is thus again lowered to a position in which it shuts valve 74 and stops the flow of chlorine solution. The metering assembly 68 is so constructed that float 84 is maintained raised for approximately one minute, allowing five ounces of the 10% chlorine solution to feed to the retention tank. For this purpose, in one commercial embodiment, the weep hole 84 was ⅝ inches in diameter.

The supply tank 26 is sized to hold twenty-eight gallons of chlorine solution, providing a long period of service before replacement is necessary. Since the retention tank 24 preferably has a thirty gallon capacity, each of its five compartments will hold six gallons of liquid. Five ounces of chlorine solution is fed to the bacteria-laden affluent in the first compartment 50 with each flush of the toilet 14, and it has been found that this is sufficient to destroy all of the bacteria in the affluent by the time the liquid reaches the discharge pipe 62 since the retention tank holds about seven flushes of one toilet. Actual bacteriological tests performed with this system, in which only one septic tank was used, showed 625,000 colories per cc. of organisms *B. protius vulgaris* and *B. coli* group in the liquid discharged from the retention tank where no chlorine was fed, and no growth after 48 hours use when chlorine was fed. Since the bacterial count after chlorine treatment was zero, the system proved completely effective for sewage purification purposes, and the liquid could be freely discharged into the water surrounding the vessel without danger of pollution.

While a preferred embodiment of the invention has been shown and described herein, it will be apparent that numerous omissions, changes and additions may be made in such embodiment without departing from the spirit and scope of the invention.

What I claim is:

1. A sewage disposal system for floating vessels having toilet means, comprising at least one septic tank, a conduit connecting said toilet means to said septic tank whereby sewage from said toilet means may be flushed into said tank, a retention tank, conduit means connecting said septic tank to said retention tank, said retention tank having a sufficient capacity to store a relatively large volume of liquid received from said septic tank, an outlet conduit communicating with said retention tank and discharging at the exterior of said vessel, a bactericide reservoir, and a metering assembly for automatically feeding a measured amount of said bactericide to said retention tank in response to liquid flowing through said retention tank upon flushing of said toilet means.

2. A sewage disposal system for floating vessels having toilet means, comprising at least one septic tank, a conduit connecting said toilet means to said septic tank whereby sewage from said toilet means may be flushed into said tank, a retention tank, a conduit connecting said septic tank to said retention tank, said retention tank having a plurality of baffles dividing the interior thereof into a plurality of compartments and providing a tortuous path for the flow of liquid therethrough, an outlet conduit communicating with the last compartment in said retention tank and leading to the exterior of said vessel, a bactericide reservoir, and a metering assembly for automatically feeding a measured amount of said bactericide to the retention tank in response to liquid flowing therethrough upon the flushing of said toilet means.

3. A sewage disposal system for floating vessels having toilet means, comprising at least one septic tank, a conduit connecting said toilet means to said septic tank whereby sewage from said toilet means may be flushed into said tank, a retention tank, a conduit connecting said septic tank to said retention tank for feeding bacteria-treated affluent to the latter, said retention tank having an internal reservoir area normally storing relatively large volume of said affluent at an overflow level and an overflow chamber located adjacent said reservoir area, an outlet conduit communicating with said overflow chamber and discharging outside said vessel, a source of bactericide, and a metering assembly for automatically feeding a measured amount of said bactericide to the reservoir area of said retention tank in response to overflow of affluent into said overflow chamber when sewage is flushed from said toilet means into said septic tank.

4. A sewage disposal system according to claim 2, in which said metering assembly includes a conduit connecting said source of bactericide with the reservoir area of said retention tank, valve means associated with said conduit and having a normally-closed position in which it blocks the flow of bactericide to said retention tank, and a float located within said overflow chamber and operatively coupled to said valve means for opening the latter when overflow affluent is discharged into said overflow chamber.

5. A sewage disposal system according to claim 4 in which said outlet conduit has an end portion extending upwardly within said overflow chamber and having a weep hole therein for gradual discharge of overflow affluent from said chamber whereby said float maintains said valve means open for a sufficient period to feed to said retention tank a quantity of bactericide capable of destroying the bacteria in the affluent located in said retention tank.

6. A sewage disposal system according to claim 5 in which said retention tank has a plurality of partition baffles forming said reservoir area and providing a tortuous path for the flow of liquid therethrough, one of said partition baffles being upstanding and providing an overflow wall between said reservoir area and said overflow chamber.

7. A sewage disposal system for a floating vessel having toilet means adapted to flush sewage therefrom, said system comprising at least one enclosed septic tank, a sewage discharge pipe connecting said toilet means with said septic tank for the discharge of sewage into the latter, to an overflow level at which the septic tank is substantially filled, a retention tank having an inlet end and an outlet end, conduit means connecting said septic tank with the inlet end of said retention tank, said conduit means commuicating with said septic tank at said overflow level for discharge of bacteria-treated affluent to said retention tank when sewage is discharged into said septic tank, metering means for injecting a measured amount of bactericide into the inlet end of said retention tank to mix with the affluent fed thereto in response to the movement of affluent through the system with each flush of said toilet means, and a discharge conduit communicating with the outlet end of said retention tank and opening at the exterior of said vessel for discharging bactericide-treated affluent into the water surrounding said vessel.

8. A sewage disposal system for a floating vessel having toilet means adapted to flush sewage therefrom, said system compriing at least one closed septic tank, a sewage discharge pipe connecting said toilet means with said septic tank, and having an end portion extending downwardly into said septic tank for the discharge of sewage into the latter at one side thereof, a retention tank having an inlet end and an outlet end, conduit means connecting said septic tank with said retention tank and including an end portion extending downwardly within the other side of said septic tank and communicating with the inlet end of said retention tank, said septic tank being normally filled with affluent including sewage solids decomposed by bacteria action to an overflow level located above the level of said conduit means end portion, whereby when sewage is discharged into said septic tank a corresponding volume of affluent is fed through said conduit means to said retention tank, metering means for injecting a measured amount of liquid bactericide into the inlet end of said retention tank to mix with the affluent fed thereto in response to the movement of affluent through the system with each flush of said toilet means, and a discharge conduit communicating with the outlet end of said retention tank and opening at the exterior of said vessel for discharging bactericide-treated affluent into the water surrounding said vessel.

9. A sewage disposal system for a floating vessel having toilet means adapted to flush sewage therefrom, said sewage disposal system comprising at least one enclosed septic tank communicating with said toilet means and adapted to receive the sewage flushed therefrom and to maintain said sewage in a relatively large volume of affluent containing a high concentration of bacteria for a sufficient period to disintegrate the solids in said sewage by bacteria action, a closed retention tank having an inlet end and an outlet end, a conduit connecting the inlet end of said retention tank to the upper portion of said septic tank for passage of overflow bacteria-treated affluent to said retention tank when sewage is flushed into said septic tank, said retention tank having a storage capacity equal to the volume of a plurality of flushes of said toilet means, and normally storing a relatively large volume of affluent, conduit means connecting said retention tank with the exterior of said vessel and located at a level in said retention tank sufficient to overflow affluent from said retention tank outside said vessel, said system having an operational cycle in which sewage flushed from said toilet means is fed to said septic tank to displace a corresponding amount of affluent therein and to cause a progressive movement of affluent from said septic tank through said retention tank to the exterior of said vessel, and means responsive to each operational cycle for feeding to the inlet end of said retention tank a measured amount of bactericide sufficient to destroy the bacteria in the affluent fed from said septic tank to said retention tank during said cycle.

10. A sewage disposal system for a floating vessel having toilet means adapted to flush sewage therefrom, said sewage disposal system comprising at least one enclosed septic tank communicating with said toilet means and adapted to receive the sewage flushed therefrom and to maintain said sewage in a relatively large volume of affluent containing a high concentration of bacteria or a sufficient period to disintegrate the solids in said sewage by bacteria action, a closed retention tank having an inlet end and an outlet end, a conduit connecting the inlet end of said retention tank to the upper portion of said septic tank for passage of overflow bacteria-treated affluent to said retention tank when sewage is flushed into said septic tank, said rentention tank normally containing a relatively large volume of affluent relative to the volume of sewage flushed from said toilet means, said affluent in the retention tank normally being below an overflow level, discharge conduit means communicating with said retention tank and opening at the exterior of said vessel for discharging from said retention tank affluent located above the overflow level therein, said system having an operational cycle in which sewage flushed from said toilet means is fed to said septic tank to displace a corresponding amount of affluent therein and to cause a progressive movement of affluent from said septic tank through said retention tank to the exterior of said vessel, a source of bactericide and metering means responsive to each operational cycle for feeding to the inlet end of said retention tank a measured amount of bactericide sufficient to destroy the bacteria in the affluent fed from said septic tank to said retention tank during said cycle.

11. A sewage disposal system according to claim 10 in which said bactericide is a chlorine solution.

12. A sewage disposal sytsem according to claim 10 which includes two septic tanks, one of said tanks communicating with said toilet means, the other of said tanks being connected to said retention tank, and conduit means connecting said tanks in series within said system.

13. A sewage disposal system according to claim 10 in which said retention tank has an upstanding partition dividing the interior thereof into an affluent storage compartment adjacent its inlet end and an overflow compartment at its outlet end, the affluent in said retention tank rising above said overflow level at each operation cycle of said system and flowing over said partition into said overflow compartment, said discharge conduit means communicating with said overflow compartment and being adapted to discharge affluent therefrom at a relatively slow rate.

14. A sewage disposal system according to claim 13 in which said metering means includes a float valve associated with said overflow compartment and operative to feed bactericide into said storage compartment when said overflow compartment is filled with affluent at a level above said discharge conduit means.

15. A sewage disposal system according to claim 14 in which said float valve includes a float located within said overflow compartment and a rotary valve coupled to said float and operatively connecting said source of bactericide to said storage compartment.

16. A sewage disposal system according to claim 15 in which said discharge conduit means includes an upstanding end portion located within said overflow compartment and having a weep hole therein.

References Cited by the Examiner

UNITED STATES PATENTS

| | | | |
|---|---|---|---|
| 2,666,740 | 1/1954 | Gordon | 210—15 |
| 2,798,228 | 7/1957 | Boester | 4—10 |
| 2,858,939 | 11/1958 | Corliss | 4—10 |
| 2,865,028 | 12/1958 | Potenaude | 4—10 |
| 3,079,612 | 3/1963 | Corliss | 4—10 |
| 3,196,105 | 7/1965 | Schneider | 210—12 |
| 3,242,055 | 3/1966 | De Lucia | 210—18 |

LAVERNE D. GEIGER, *Primary Examiner.*

H. K. ARTIS, *Assistant Examiner.*